J. W. HARRIS.
PROCESS FOR JOINING MATERIALS.
APPLICATION FILED JUNE 8, 1918.

1,359,594.

Patented Nov. 23, 1920.

Inventor:
Jonathan W. Harris.
by J. E. Roberts
Att'y.

UNITED STATES PATENT OFFICE.

JONATHAN W. HARRIS, OF MONTCLAIR, NEW JERSEY, ASSIGNOR TO WESTERN ELECTRIC COMPANY, INCORPORATED, OF NEW YORK, N. Y., A CORPORATION OF NEW YORK.

PROCESS FOR JOINING MATERIALS.

1,359,594.   Specification of Letters Patent.   Patented Nov. 23, 1920.

Original application filed October 18, 1916, Serial No. 126,236. Divided and this application filed June 8, 1918. Serial No. 238,834.

*To all whom it may concern:*

Be it known that I, JONATHAN W. HARRIS, a citizen of the United States, residing at Montclair, in the county of Essex, State of New Jersey, have invented certain new and useful Improvements in Processes for Joining Materials, of which the following is a full, clear, concise, and exact description.

This invention relates to processes of joining materials and more particularly to processes of joining vitreous materials to metal.

This application is a division of my copending application Serial No. 126,236, filed October 18, 1916.

In many instances it is desirable to support members composed of frangible material from other rigid members. In telephone transmitter mouthpieces, it is especially desirable, from a sanitary viewpoint, to employ for certain portions, porcelain or other similar vitreous materials which may be readily sterilized. Since portions composed of such frangible materials may become chipped or otherwise damaged under ordinary service conditions, it is desirable to attach them to the supporting members by means adapted to absorb the shocks received by the supporting members and to effectively prevent their transmission to the frangible portion. Also, due to the cushioning effect produced by a shock absorbing junction of this character the frangible portion so supported may be subjected to a considerably greater blow without being damaged thereby than would be the case if such portion were rigidly attached to the supporting member.

It is the object of this invention to provide a process for joining a member of frangible material to a rigid member by a resilient shock absorbing binding material which is unaffected by the usual sterilizing process.

The nature of the invention will appear more fully from the following specification and the annexed drawing, the various figures of which illustrate a specific embodiment thereof.

Figure 1:
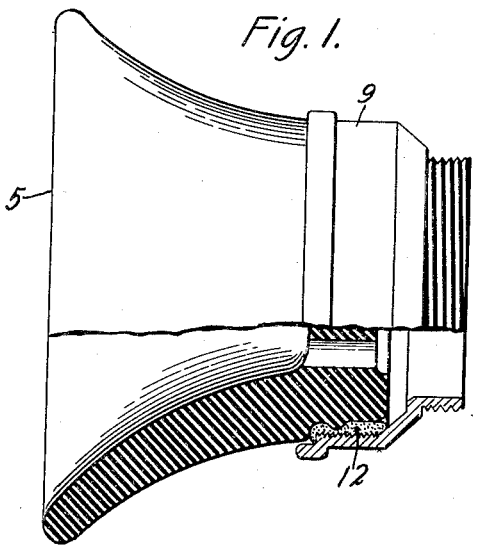
Figures 2, 3, 4:
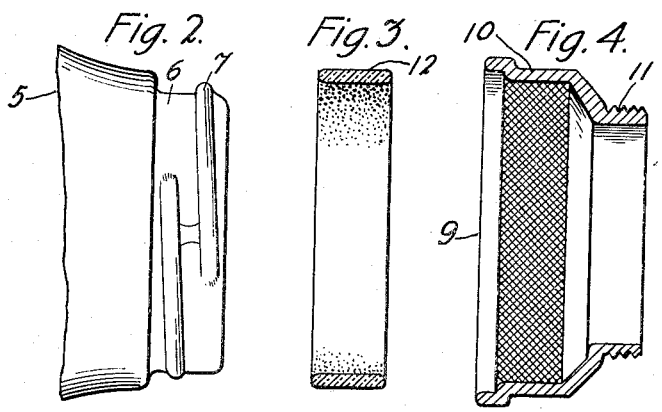

In the accompanying drawing, Figure 1 shows the assembled structure of a telephone transmitter mouthpiece manufactured in accordance with the process of the invention; and Figs. 2, 3 and 4 illustrate various details of the structure shown in Fig. 1.

In a telephone transmitter mouthpiece manufactured in accordance with the process of this invention, the body portion 5, which is usually funnel shaped and preferably composed of porcelain, is provided at its base with a contracted portion 6. This contracted portion is provided with a roughened surface which may be formed in the shape of a partial screw thread 7, as clearly shown in Fig. 2. The adapter or ferrule 9 comprises a metal ring having an enlarged portion 10 and a contracted portion 11, as most clearly indicated in Figs. 1 and 4. The contracted portion is outwardly threaded to engage the face plate of a telephone transmitter (not shown). The enlarged portion 10 is roughened on its inner surface in any desired manner to increase adhesion between the surface and the binder 12.

In manufacturing a mouthpiece in accordance with the process of this invention, the binder 12, which secures the body portion 5 and the adapter 9 together is preferably applied in the form of a band or strip of rubber compound which, in assembling the structure, is wrapped around the contracted portion 6 of the porcelain body portion. It has been found that very satisfactory results are obtained by using rubber compound sheeting about $\frac{1}{16}$ of an inch in thickness which is cut into strips approximately $\frac{1}{4}$ of an inch in width and about $3\frac{1}{4}$ inches in length. After this strip is wrapped around the contracted and threaded portion of the porcelain body portion the metal ferrule 9 is then pressed into place and held by a suitable clamp. The assembled structure is then placed in an oven and kept at a temperature of approximately 170° C. for one or two hours to vulcanize the rubber. This process forms a resilient adhesive binder, securely attaching the porcelain to the ferrule. The structure manufactured in accordance with this process may be cleansed in boiling water without any resulting damage and the resiliency of the rubber junction after vulcanization is sufficient to enable it to absorb the shocks, resulting from the very rough use of the mouthpiece during service, with a minimum danger of breakage.

What is claimed is:

1. The method of forming a resilient shock absorbing binder between vitreous and metallic parts of an article which consists in inserting a layer of vulcanizable material therebetween and subjecting such material to a temperature of approximately 170° centigrade for a period of from one to two hours.

2. The method of attaching metal to a vitreous material which consists in inserting a layer of vulcanizable material therebetween and subjecting the same to vulcanizing temperatures for a period of from one to two hours.

3. The method of attaching metal to porcelain which consists in inserting a layer of rubber compound therebetween and subjecting the combined structure to a temperature of approximately 170° centigrade for a period of from one to two hours.

4. The method of forming a shock absorbing junction between vitreous and metallic materials which consists in interposing a vulcanizable binder therebetween and subjecting the structure thus produced to a temperature of approximately 170° centigrade for a period of from one to two hours until the binder forms an adhesive connection between the materials.

5. The method of attaching metal to vitreous material which consists in interposing a layer of vulcanizable material between the vitreous material and the metal and subjecting the metal, the vulcanizable material and the vitreous material to vulcanizing temperatures.

In witness whereof, I hereunto subscribe my name this 4th day of June A. D., 1918.

JONATHAN W. HARRIS.